(12) United States Patent
Satish et al.

(10) Patent No.: US 9,064,120 B2
(45) Date of Patent: Jun. 23, 2015

(54) SYSTEMS AND METHODS FOR DIRECTING APPLICATION UPDATES

(71) Applicant: Symantec Corporation, Mountain View, CA (US)

(72) Inventors: Sourabh Satish, Fremont, CA (US); Abubakar A. Wawda, Cupertino, CA (US); Petrus Johannes Viljoen, Manhattan Beach, CA (US); Gerry A. Egan, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 53 days.

(21) Appl. No.: 13/928,348

(22) Filed: Jun. 26, 2013

(65) Prior Publication Data

US 2015/0007332 A1 Jan. 1, 2015

(51) Int. Cl.
*G06F 11/36* (2006.01)
*G06F 21/57* (2013.01)
*G06F 9/445* (2006.01)
*G06F 21/51* (2013.01)

(52) U.S. Cl.
CPC ............... *G06F 21/577* (2013.01); *G06F 8/60* (2013.01)

(58) Field of Classification Search
CPC ......... G06F 21/77; G06F 21/57; G06F 21/56; H04L 63/145; H04L 63/1433
See application file for complete search history.

(56) References Cited

U.S. PATENT DOCUMENTS

| 7,712,132 | B1* | 5/2010 | Ogilvie | ............................. 726/22 |
| 7,966,278 | B1 | 6/2011 | Satish | |
| 2009/0119681 | A1* | 5/2009 | Bhogal et al. | .................. 719/318 |
| 2010/0100966 | A1 | 4/2010 | Hamid | |
| 2013/0254889 | A1* | 9/2013 | Stuntebeck | ...................... 726/23 |

OTHER PUBLICATIONS

Understanding Software Patching. Dadzie, Joseph. ACMQueue(2005).*
"Secunia Software Informer", http://secunia-psi.software.informer.com/, as accessed Apr. 11, 2013, (Dec. 28, 2008).

* cited by examiner

*Primary Examiner* — Venkat Perungavoor
(74) *Attorney, Agent, or Firm* — ALG Intellectual Property, LLC

(57) ABSTRACT

A computer-implemented method for directing application updates may include (1) identifying information that indicates a rate at which an earlier version of an application is exploited in attacks on computing system security, (2) identifying additional information that indicates a rate at which a later version of the application is exploited in attacks on computing system security, (3) determining how updating the application from the earlier version to the later version will impact computing system security by comparing the rate the earlier version of the application is exploited with the rate at which the later version of the application is exploited, and (4) directing a computing system with a determination about updating an installation of the earlier version of the application to the later version of the application based on determining how updating the application will impact computing system security. Various other methods, systems, and computer-readable media are also disclosed.

20 Claims, 6 Drawing Sheets

SYSTEMS AND METHODS FOR DIRECTING APPLICATION UPDATES

BACKGROUND

Consumers and businesses increasingly rely on computing systems (e.g., smartphones, tablets, laptops, etc.) to store and manage sensitive data. Consequently, malicious programmers seem to continuously increase their efforts to gain illegitimate control and access to these computing systems through the use of viruses, Trojan horses, worms, and other programs meant to compromise computing systems and data belonging to other people.

The level to which a computing system is exposed to malicious attacks may be based on the level to which software components (e.g., the operating system and applications) running on the computing system are exposed to malicious attacks. Unfortunately, consumers may be in a poor position to assess the vulnerability of the various software components that run on their computing systems. Some consumers may assume that newer versions of software components are more secure and trustingly accept all software updates, some of which may increase their exposure to attacks. Other consumers may assume that currently installed versions of software components on their computing systems are adequately secure, and fail to take the time or effort to perform software updates that would lower their exposure to attacks. Accordingly, the instant disclosure identifies and addresses a need for additional and improved systems and methods for directing application updates.

SUMMARY

As will be described in greater detail below, the instant disclosure generally relates to systems and methods for directing application updates by determining whether newer versions of applications are exploited more (or less) by attacks and then directing computing systems with instructions that facilitate and/or encourage updates to more secure versions of applications and/or directing computing systems with instructions that prevent, protect against, and/or discourage updates to less secure versions of applications.

In one example, a computer-implemented method for directing application updates may include (1) identifying information that indicates a rate at which installations of an earlier version of an application are exploited in attacks on computing system security, (2) identifying additional information that indicates a rate at which installations of a later version of the application are exploited in attacks on computing system security, (3) determining how updating the application from the earlier version to the later version will impact computing system security at least in part by comparing the rate at which installations of the earlier version of the application are exploited with the rate at which installations of the later version of the application are exploited, and (4) directing at least one computing system with a determination about updating an installation of the earlier version of the application to the later version of the application based at least in part on determining how updating the application will impact computing system security.

In some examples, determining how updating the application from the earlier version to the later version will impact computing system security may include determining that the earlier version of the application is more likely to be exploited than the later version of the application. In these examples, directing the computing system with the determination about updating the installation of the earlier version of the application may include directing the computing system to update the installation of the earlier version of the application to the later version of the application. Additionally or alternatively, in these examples, directing the computing system with the determination about updating the installation of the earlier version of the application may include directing the computing system to display a notification recommending that the installation of the earlier version of the application be updated to the later version of the application. As another alternative in these examples, directing the computing system with the determination about updating the installation of the earlier version of the application may include directing the computing system to disable the installation of the earlier version of the application until the installation is updated to the later version of the application. Additionally or alternatively, directing the computing system with the determination about updating the installation of the earlier version of the application may include sandboxing the installation of the earlier version of the application.

In some examples, determining how updating the application from the earlier version to the later version will impact computing system security may include determining that the earlier version of the application is less likely to be exploited than the later version of the application. In these examples, directing the computing system with the determination about updating the installation of the earlier version of the application may include directing the computing system to not update the installation of the earlier version of the application to the later version of the application. Additionally or alternatively, in these examples, directing the computing system with the determination about updating the installation of the earlier version of the application may include blocking an attempt to update the installation of the earlier version of the application to the later version of the application. As another alternative in these examples, directing the computing system with the determination about updating the installation of the earlier version of the application may include directing the computing system to display a notification recommending that the installation of the earlier version of the application not be updated to the later version of the application.

In some examples, directing the computing system with the determination may be further based on determining that a stability rating of the later version of the application exceeds a predetermined threshold.

In one embodiment, a system for implementing the above-described method may include (1) an identification module that (i) identifies information that indicates a rate at which installations of an earlier version of an application are exploited in attacks on computing system security and (ii) identifies additional information that indicates a rate at which installations of a later version of the application are exploited in attacks on computing system security, (2) a determination module that determines how updating the application from the earlier version to the later version will impact computing system security at least in part by comparing the rate at which installations of the earlier version of the application are exploited with the rate at which installations of the later version of the application are exploited, (3) a direction module that directs at least one computing system with a determination about updating an installation of the earlier version of the application to the later version of the application based at least in part on determining how updating the application will impact computing system security, and (4) at least one processor configured to execute the identification module, the determination module, and the direction module.

In some examples, the above-described method may be encoded as computer-readable instructions on a computerreadable-storage medium. For example, a computer-readable-storage medium may include one or more computer-executable instructions that, when executed by at least one processor of a computing device, may cause the computing device to (1) identify information that indicates a rate at which installations of an earlier version of an application are exploited in attacks on computing system security, (2) identify additional information that indicates a rate at which installations of a later version of the application are exploited in attacks on computing system security, (3) determine how updating the application from the earlier version to the later version will impact computing system security at least in part by comparing the rate at which installations of the earlier version of the application are exploited with the rate at which installations of the later version of the application are exploited, and (4) direct at least one computing system with a determination about updating an installation of the earlier version of the application to the later version of the application based at least in part on determining how updating the application will impact computing system security.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
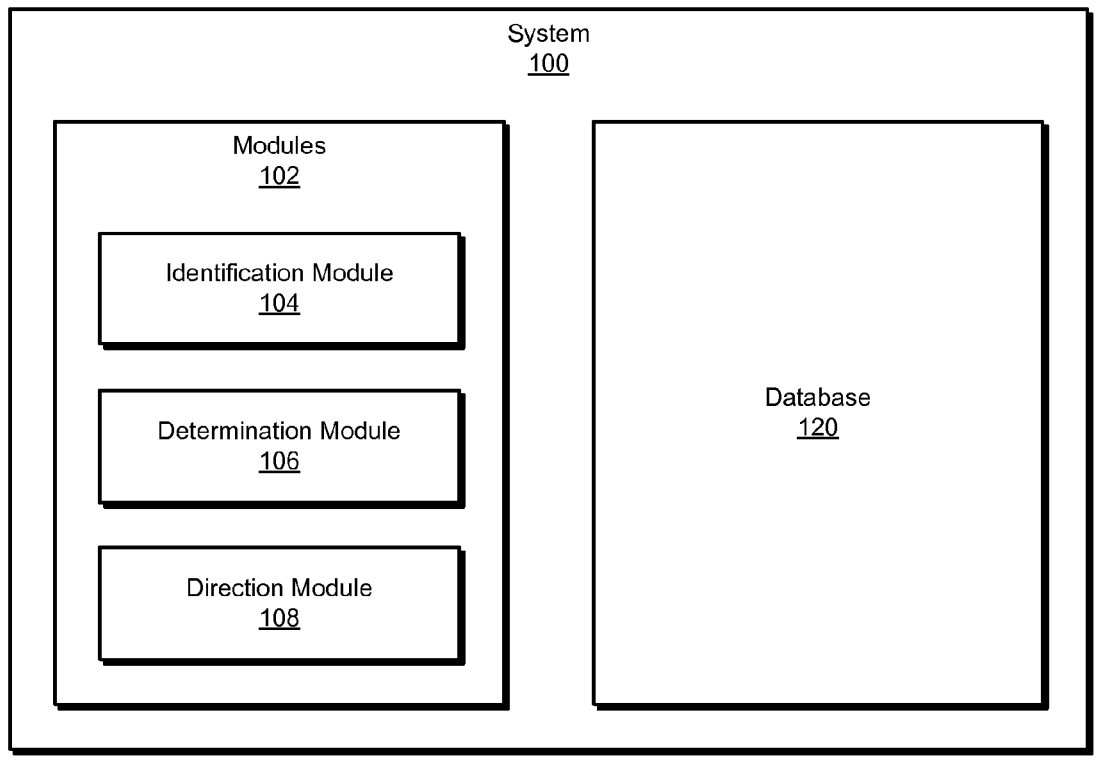
FIG. 1 is a block diagram of an exemplary system for directing application updates.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for directing application updates. As will be explained in greater detail below, by determining whether newer versions of applications are exploited more (or less) by attacks and then directing computing systems with instructions that facilitate and/or encourage updates to more secure versions of applications and/or directing computing systems with instructions that prevent, protect against, and/or discourage updates to less secure versions of applications, the systems described herein may enhance the security of computing systems through intelligent application updating.

Figure 2:
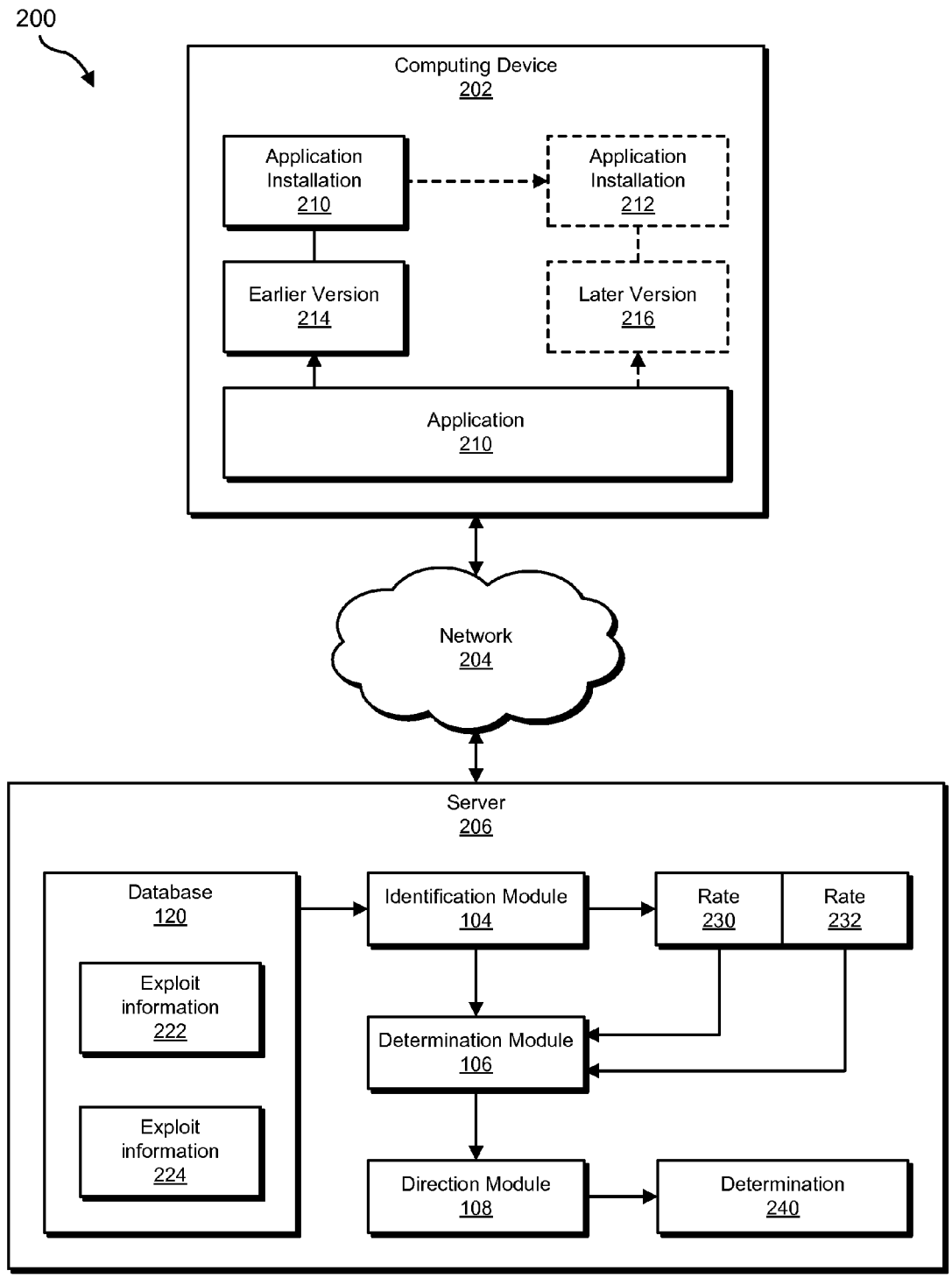
FIG. 2 is a block diagram of an exemplary system for directing application updates.
Figure 3:
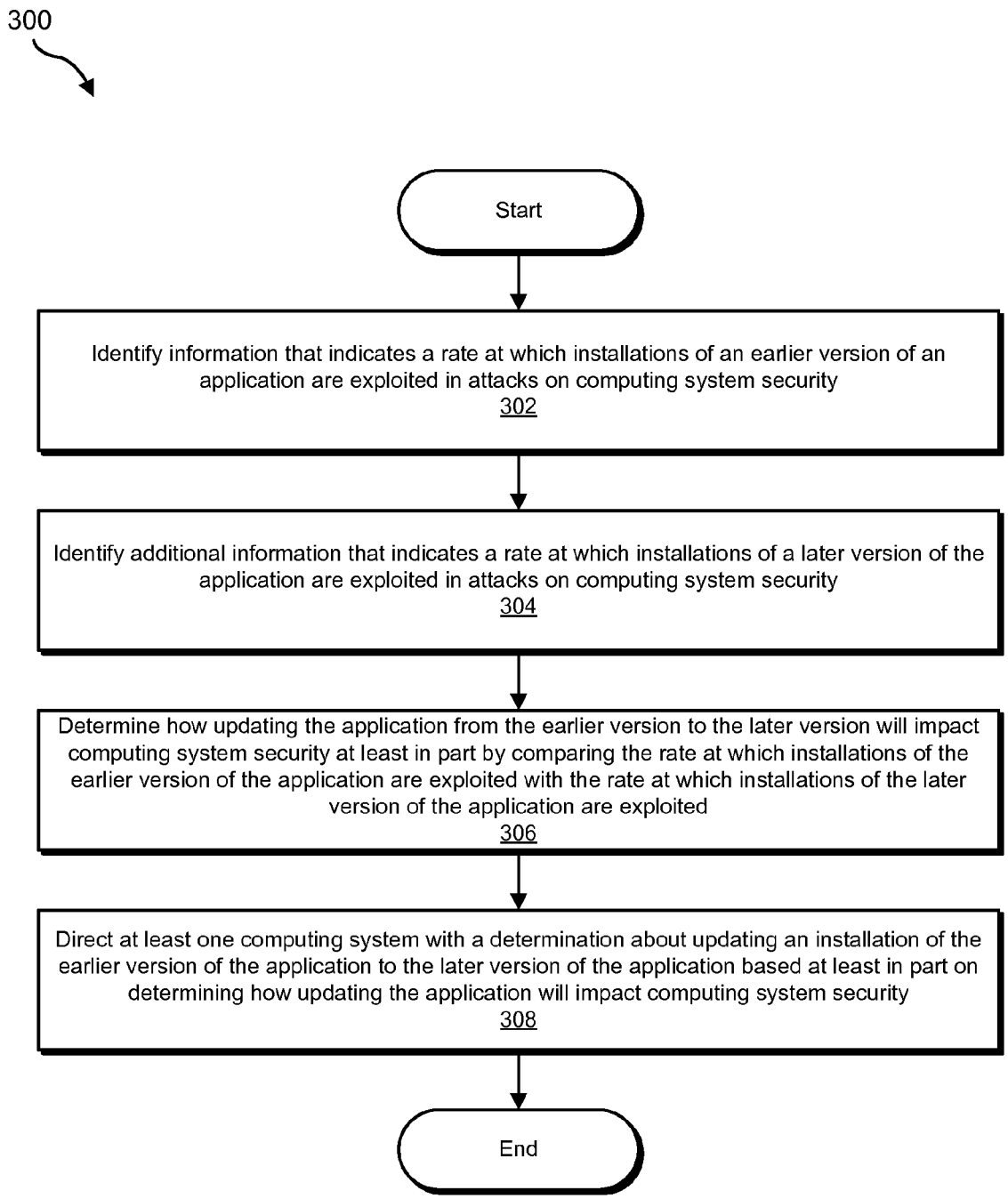
FIG. 3 is a flow diagram of an exemplary method for directing application updates.
Figure 4:
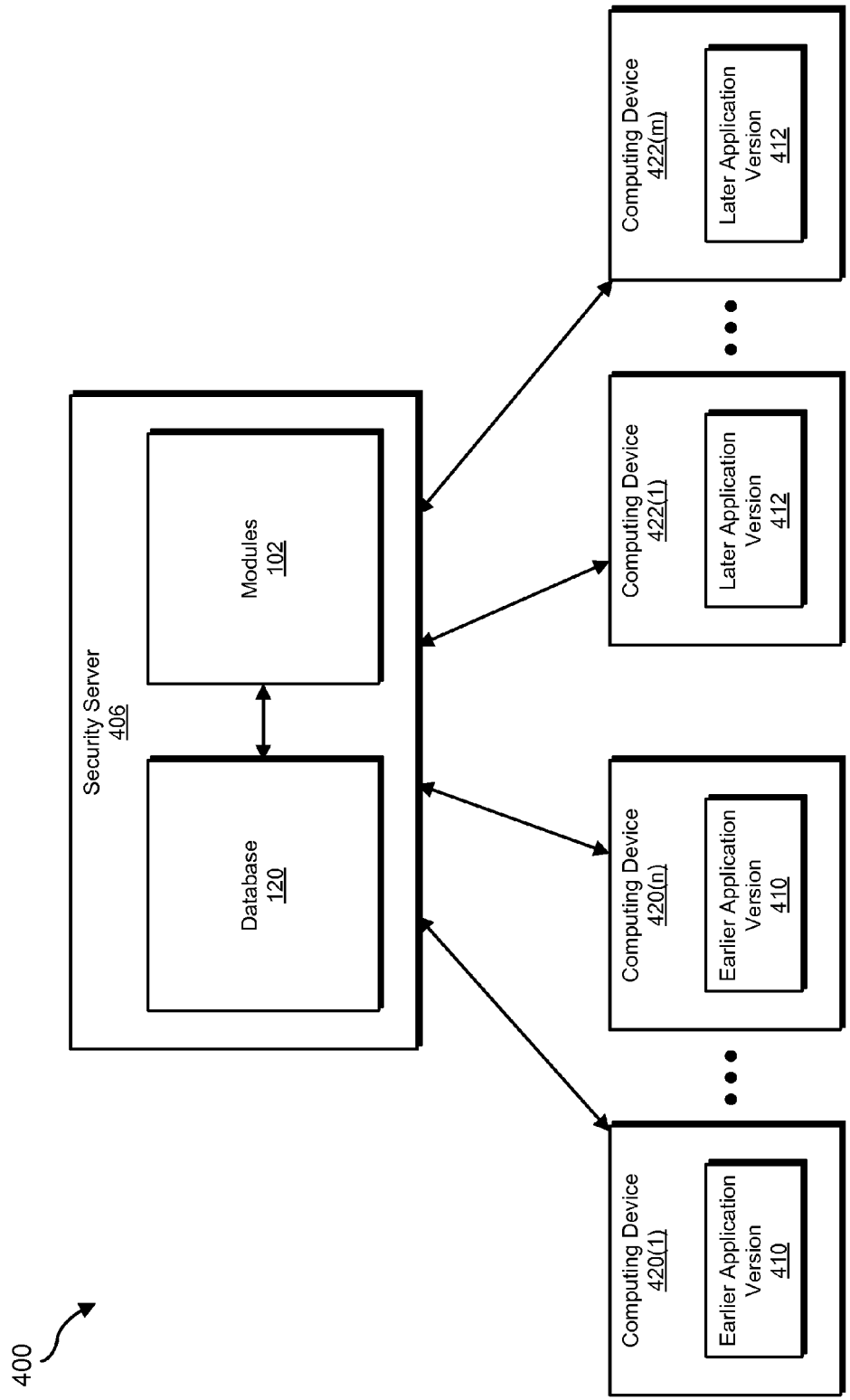
FIG. 4 is a block diagram of an exemplary system for directing application updates.

The following will provide, with reference to FIGS. 1, 2, and 4, detailed descriptions of exemplary systems for directing application updates. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for directing application updates. As illustrated in this figure, exemplary system 100 may include one or more modules 102 for performing one or more tasks. For example, and as will be explained in greater detail below, exemplary system 100 may also include an identification module 104 that may identify information that indicates a rate at which installations of an earlier version of an application are exploited in attacks on computing system security. Identification module 104 may also identify additional information that indicates a rate at which installations of a later version of the application are exploited in attacks on computing system security. Exemplary system 100 may additionally include a determination module 106 that may determine how updating the application from the earlier version to the later version will impact computing system security at least in part by comparing the rate at which installations of the earlier version of the application are exploited with the rate at which installations of the later version of the application are exploited.

Exemplary system 100 may also include a direction module 108 that may direct at least one computing system with a determination about updating an installation of the earlier version of the application to the later version of the application based at least in part on determining how updating the application will impact computing system security. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information about exploits performed through applications (e.g., including information differentiating different versions of applications).

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in directing application updates. For example, and as will be described in greater detail below, one or more of modules 102 may cause computing device 202 and/or server 206 to direct application updates. For example, and as will be described in greater detail below, identification module 104 may be programmed to identify exploit information 222 that indicates a rate 230 at which installations of an earlier version 214 of an application 210 are exploited in attacks on computing system security. Identification module 104 may also be programmed to identify exploit information 224 that indicates a rate 232 at which installations of a later version 216 of application 210 are exploited in attacks on computing system security. Determination module 106 may be programmed to determine how updating application 210 from earlier version 214 to later version 216 will impact computing system security at least in part by comparing rate 230 at which installations of earlier version 214 of application 210 are exploited with rate 232 at which installations of later version 216 of application 210 are exploited. Direction module 108 may be programmed to direct at least one computing system with a determination 240 about updating an installation of earlier version 214 of application 210 (e.g., an application installation 210) to later version 216 of application 210 (e.g., an application installation 212) based at least in part on determining how updating application 210 will impact computing system security.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Server 206 generally represents any type or form of computing device that is capable of collecting, storing, analyzing, and/or using information about application security. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for directing application updates. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify information that indicates a rate at which installations of an earlier version of an application are exploited in attacks on computing system security. For example, at step 302 identification module 104 may, as part of computing device 202 in FIG. 2, identify exploit information 222 that indicates rate 230 at which installations of earlier version 214 of application 210 are exploited in attacks on computing system security.

As used herein, the term "application" may refer to any software component capable of executing on a computing system. Accordingly, the term "application" may refer to any application, program, driver, module, service, and/or operating system that may execute on a computing system.

As used herein, the term "attack" may refer to any attempt to perform a malware installation, an exploit, an unauthorized use of computing resources, and/or an authorized access of data. As used herein, the term "exploit" may refer to any method of leveraging a security vulnerability within an application.

Identification module 104 may identify any of a variety of types of information that indicate exploit and/or attack rates connected with versions of applications. For example, identification module 104 may identify records of successful attacks and/or attempted attacks that have been directly and/or indirectly observed to involve the earlier version of the application. In this example, identification module 104 may analyze the records to determine a rate of exploits of the earlier version of the application. In some examples, identification module 104 may identify and/or determine a relative rate of exploits of the earlier version of the application (e.g., as compared to one or more later versions of the application). In some examples, identification module 104 may simply identify a rate of exploits of the earlier version of the application, a number of exploits that may be used to estimate a rate of exploits, and/or a ranking of exploit frequencies across different versions of applications that may imply a relative rate of exploits.

Identification module 104 may identify the information that indicates the rate at which installations of the earlier version of the application are exploited in any suitable manner. For example, identification module 104 may identify the information that indicates the rate by querying a security database that stores information about attacks performed on applications. For example, the security database may store data gathered from many security systems installed on many computing devices. These security systems may report to a security server when an attack (or evidence of an attack) is observed, and include in the report information about the earlier version of the application if the earlier version of the application is implicated in the observed attack. The security server may then store information about the attack in the security database for future analysis.

In some examples, identification module 104 may identify information about active exploits in the field. For example, identification module 104 may determine which exploits are currently most in use, and weigh those active exploits more heavily when determining the rate at which installations of the earlier version of the application are exploited in attacks. In some examples, identification module 104 may weigh recent reports of attacks and/or exploits more heavily than past reports.

FIG. 4 is a block diagram of an exemplary computing system 400 for directing application updates. As shown in FIG. 4, computing system 400 may include a security server 406 in communication with computing devices 420(1)-(n) that have an earlier application version 410 installed and with computing devices 420(1)-(m) that have a later application version 412 installed. Using FIG. 4 as an example, computing devices 420(1)-(n) may have reported one or more exploits of and/or attacks leveraging earlier application version 410 to security server 406. Security server 406 may have stored these reports in database 120. Accordingly, at step 302 identification module 104 may, as a part of security server 406, identify information that indicates a rate at which installations of earlier application version 410 are exploited in attacks on computing system security.

Returning to FIG. 3, at step 304 one or more of the systems described herein may identify additional information that indicates a rate at which installations of a later version of the application are exploited in attacks on computing system security. For example, at step 304 identification module 104 may, as part of computing device 202 in FIG. 2, identify exploit information 224 that indicates rate 232 at which installations of later version 216 of application 210 are exploited in attacks on computing system security.

The later version of the application may relate to the earlier version of the application in any of a variety of ways. For example, the later version of the application may represent a version of the application that immediately succeeds the earlier version of the application. Additionally or alternatively, the later version of the application may represent a version of the application to which the earlier version may be directed updated. In some examples, the later version of the application may represent any version of the application published and/or distributed at a date later than the earlier version. Additionally or alternatively, the later version of the application may represent a version of the application with a later version number than the earlier version and/or with an indicator that the later version is meant to replace the earlier version.

Identification module 104 may identify the information that indicates the rate at which installations of the later version of the application are exploited in any suitable manner. For example, identification module 104 may identify the information that indicates the rate by querying a security database that stores information about attacks performed on applications. For example, the security database may store data gathered from many security systems installed on many computing devices. These security systems may report to a security server when an attack (or evidence of an attack) is observed, and include in the report information about the earlier version of the application if the earlier version of the application is implicated in the observed attack. The security server may then store information about the attack in the security database for future analysis. In some examples, a computing device may send one or more reports to the security server when the earlier version of the application is installed, and send one or more additional reports to the security server after the application is updated to the later version.

Using FIG. 4 as an example, computing devices 422(1)-(m) may have reported one or more exploits of and/or attacks leveraging later application version 410 to security server 406. Security server 406 may have stored these reports in database 120. Accordingly, at step 304 identification module 104 may, as a part of security server 406, identify information that indicates a rate at which installations of later application version 410 are exploited in attacks on computing system security.

Returning to FIG. 3, at step 306 one or more of the systems described herein may determine how updating the application from the earlier version to the later version will impact computing system security at least in part by comparing the rate at which installations of the earlier version of the application are exploited with the rate at which installations of the later version of the application are exploited. For example, at step 306 determination module 106 may, as part of computing device 202 in FIG. 2, determine how updating application 210 from earlier version 214 to later version 216 will impact computing system security at least in part by comparing rate 230 at which installations of earlier version 214 of application 210 are exploited with rate 232 at which installations of later version 216 of application 210 are exploited.

Determination module 106 may compare the rate at which installations of the earlier version of the application are exploited with the rate at which installations of the later version of the application are exploited in any of a variety of ways. For example, determination module 106 may compare a percentage of earlier version installations that are exploited with a percentage of later version installations that are exploited and determine which percentage is higher. As another example, determination module 106 may perform a statistical analysis on the information about exploits of the earlier and later versions of the application (e.g., controlling for potentially confounding variables such as hardware configurations, computing system age, other installed applications, other vulnerability factors, etc.) to determine the relative contributions of the earlier and later versions of the application to computing system vulnerabilities.

In some examples, determination module 106 may determine that the earlier version of the application is more likely to be exploited than the later version of the application. For example, determination module 106 may determine that, after controlling for other factors, the earlier version of the application attracts and/or successfully allows more attacks than does the later version of the application. Alternatively, in some examples, determination module 106 may determine that the later version of the application is more likely to be exploited than the earlier version of the application.

At step 308, one or more of the systems described herein may direct at least one computing system with a determination about updating an installation of the earlier version of the application to the later version of the application based at least in part on determining how updating the application will impact computing system security. For example, at step 308 direction module 108 may, as part of computing device 202 in FIG. 2, direct at least one computing system with determination 240 about updating an installation of earlier version 214 of application 210 (e.g., application installation 210) to later version 216 of application 210 (e.g., application installation 212) based at least in part on determining how updating application 210 will impact computing system security.

Direction module 108 may direct the computing system with the determination in any suitable manner. For example, direction module 108 may send an instruction to a security system installed on the computing system regarding a potential update of the application. In some examples, direction module 108 may send the instruction in response to receiving a request from the computing system for information about the later version of the application. Additionally or alternatively, direction module 108 may send the instruction in response to receiving a report from the computing system that the earlier version of the application is currently installed on the computing system.

As mentioned earlier, in some examples one or more of the systems described herein may determine that the earlier version of the application is more likely to be exploited than the later version of the application. In these examples, direction module 108 may direct the computing system with any of a variety of directives to facilitate and/or encourage updating the application. For example, direction module 108 may direct the computing system to update the installation of the earlier version of the application to the later version of the application. In this example, the computing system may update the installation of the earlier version of the application to the later version in response to receiving the instruction from direction module 108. As another example, direction module 108 may direct the computing system to display a notification recommending that the installation of the earlier version of the application be updated to the later version of the application. For example, direction module 108 may classify the update as "recommended" and/or "important," and an update manager on the computing system may present the classification to a user via a user interface. Additionally or alternatively, direction module 108 may direct the update manager to prompt a user to update the installation of the application to the later version.

In an additional example, direction module 108 may direct the computing system to disable the installation of the earlier version of the application until the installation is updated to the later version of the application. For example, direction module 108 may direct the computing system to quarantine the application and/or to disallow execution of the application until the application is updated to the later version of the application. In some examples, direction module 108 may direct the computing system to prompt a user to update the application when the user attempts to launch the earlier version of the application. Additionally or alternatively, direction module 108 may direct the computing system to sandbox the installation of the earlier version of the application. For example, direction module 108 may direct the computing system to intercept actions (such as input/output attempts, system configuration attempts) by the installation of the earlier version of the application and perform the actions on behalf of the application within one or more virtualization layers (e.g., so that, from the perspective of the application, the application can make persistent changes to the computing system, but that from the perspective of the computing system, the application can only make changes within defined boundaries, thereby preventing any attack from spreading beyond the application).

In some examples, direction module 108 may direct the computing system to not automatically update the application (or advise a user to update the application) even though the later version of the application is less vulnerable to exploits than the earlier version due to a different flaw of the later version of the application. For example, direction module 108 may determine that a stability rating of the later version of the application is lower than a stability rating of the earlier version of the application and that the application should not be updated. The stability rating may include any indication of an impact of the application on the reliability and/or performance of the computing system on which the application is installed.

As mentioned earlier, in some examples one or more of the systems described herein may determine that the later version of the application is more likely to be exploited than the earlier version of the application. In these examples, direction module 108 may direct the computing system with any of a variety of directives to prevent, protect against, and/or discourage updating the application. For example, direction module 108 may direct the computing system to not update the installation of the earlier version of the application to the later version of the application. In this example, the computing system may remove the application from a list of automatic updates to apply. Additionally or alternatively, direction module 108 may direct the computing system to block an attempt to update the installation of the earlier version of the application to the later version of the application. For example, a security system on the computing system may interfere with an attempt by an update manager to update the installation of the earlier version of the application. As another example, a security system may override a user's selection to update the installation of the application.

In an additional example, direction module 108 may direct the computing system to display a notification recommending that the installation of the earlier version of the application not be updated to the later version of the application. For example, direction module 108 may classify the update as "not recommended" and/or "dangerous," and an update manager on the computing system may present the classification to a user via a user interface. Additionally or alternatively, direction module 108 may direct the update manager to prompt a user to avoid updating the installation of the application to the later version and/or to inform the user of the security risks of updating the installation of the application to the later version. After step 306, method 300 may terminate.

As explained above in connection with method 300 in FIG. 3, by determining whether newer versions of applications are exploited more (or less) by attacks and then directing computing systems with instructions that facilitate and/or encourage updates to more secure versions of applications and/or directing computing systems with instructions that prevent, protect against, and/or discourage updates to less secure versions of applications, the systems described herein may enhance the security of computing systems through intelligent application updating.

In one example, a security agent may collect information that includes (1) file creation information that describes who created which files on a computing system, (2) application information that identifies when an application is installed and/or updated, (3) which binaries are created as part of the application installation, (4) version information for the application, and (5) information relating to the conviction of files. A backend system may mine the above information to identify all files that created malware (e.g., in the recent past) that was subsequently detected and remediated. This backend process may also mine data to identify which application each of these files belongs to and if there is a newer version of the file available.

For each binary, the backend may then generate data that identifies information including (1) a hash of the file, (2) whether the file is actively dropping malware, (3) a name of the application that the file belongs to, (4) a version of the application that the file belongs to, (5) whether a new version of the application exists, and (6) whether the newer version is being actively exploited more than the previous version.

At any opportune time (such as during a security scan, when a user uses the application, and/or when a file is creating malware), the security agent may query the backend for file information. If the backend determines that the file is actively dropping malware and that a newer version exists (and that the newer version is not being actively exploited as much as the current version), then the security agent may take one of several actions. For example, the security agent may (1) alert and/or notify a user to update the application, (2) lock down the application until the application is updated, (3) perform the update of the application (e.g., without user input), and/or (4) virtualize all actions of the application.

In some examples, application version information may not be readily available. In these examples, one or more of the systems described herein may use heuristic methods to determine which version of an application is newer (by, e.g., relying on creation times and/or installation times of the different versions of the application across many computing systems). These systems may consider files (identified with hashes) that belong to an application and are created after files with the same file names and/or components as indicating a newer version of the application. Application stability information may also be available to the backend and may be used to recommend that users not update the application if the newer version is known to be incompatible and/or worse in terms of stability and/or user experience.

Figure 5:
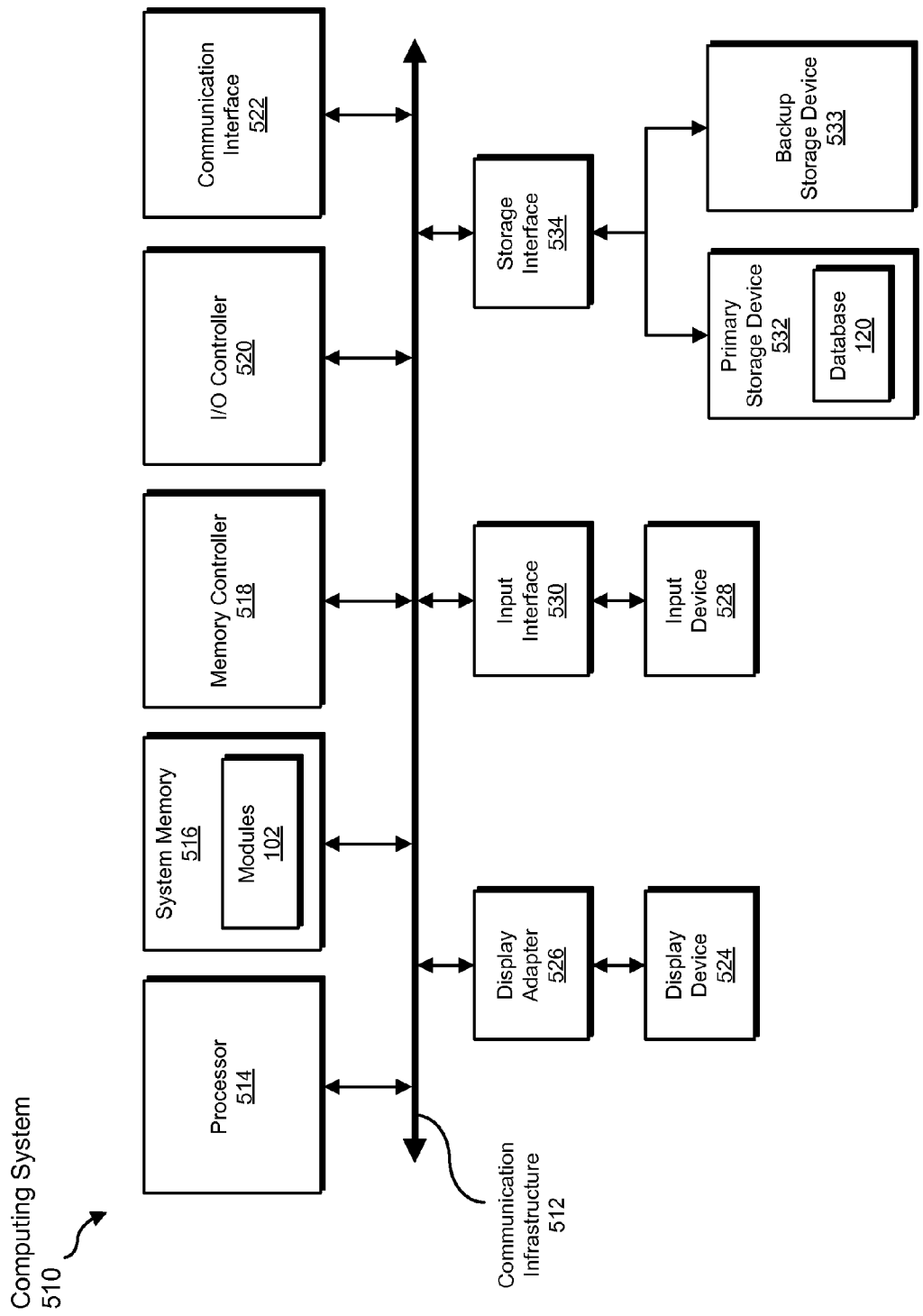
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
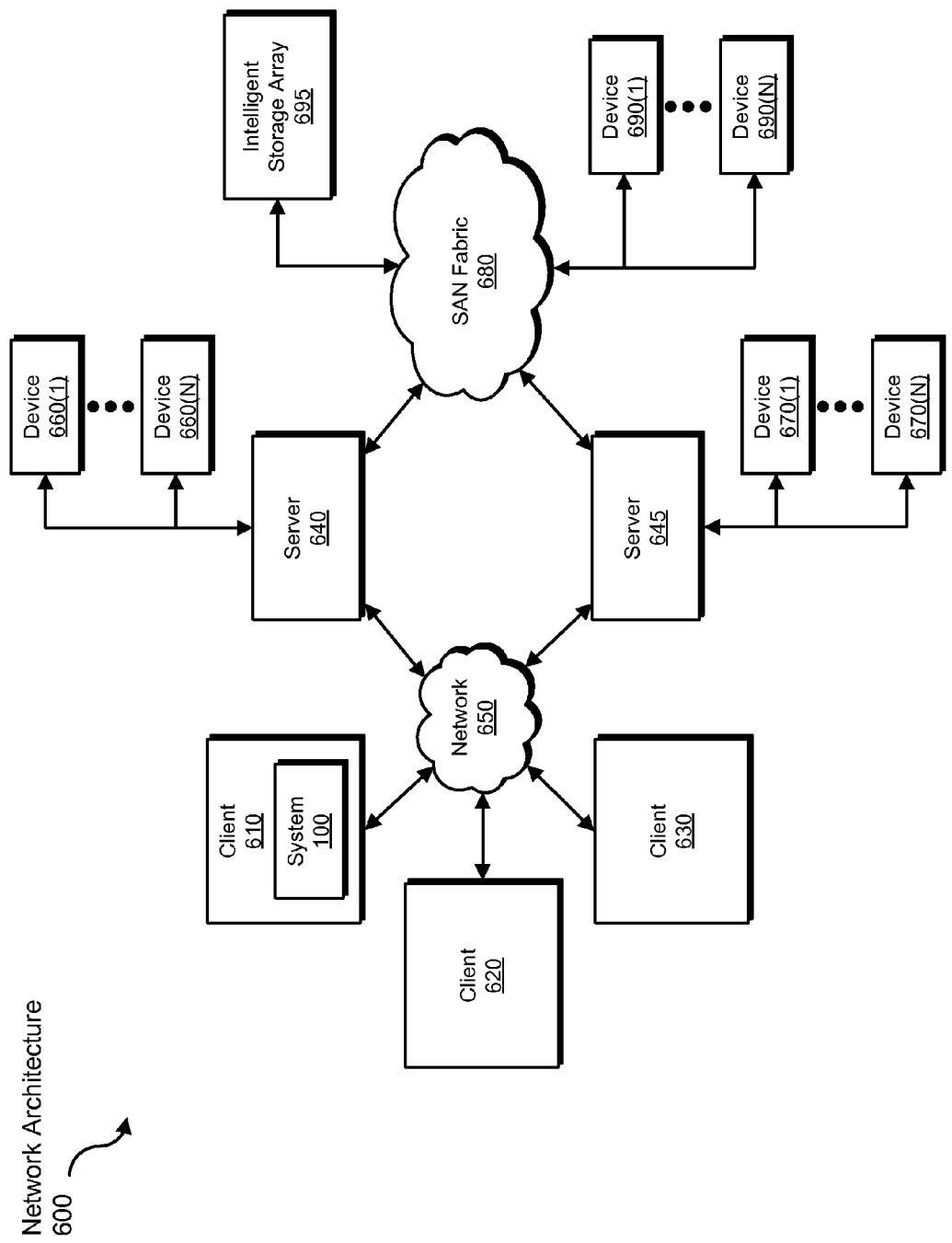
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for directing application updates.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive application exploit information to be transformed, transform the application exploit information, output a result of the transformation to a determination of whether to update an application, output a result of the transformation to a client system with the application installed, use the result of the transformation to facilitate or prevent the application from being updated, and store the result of the transformation on a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for directing application updates, at least a portion of the method being performed by a computing device comprising at least one processor, the method comprising:
    identifying, at a server, information that indicates a rate at which installations of an earlier version of an application are exploited in attacks on computing system security;
    identifying, at the server, additional information that indicates a rate at which installations of a later version of the application are exploited in attacks on computing system security;
    determining, at the server, how updating the application from the earlier version to the later version will impact computing system security on at least one client device at least in part by determining, by comparing the rate at which installations of the earlier version of the application are exploited with the rate at which installations of the later version of the application are exploited, that the earlier version of the application is less likely to be exploited than the later version of the application;
    directing, by the server, the at least one client device to prevent updating an installation of the earlier version of the application to the later version of the application based at least in part on determining how updating the application will impact computing system security.

2. The computer-implemented method of claim 1, wherein directing the client device to prevent updating the installation of the earlier version of the application comprises directing the client device to not update the installation of the earlier version of the application to the later version of the application.

3. The computer-implemented method of claim 1, wherein directing the client device to prevent updating the installation of the earlier version of the application comprises blocking an attempt to update the installation of the earlier version of the application to the later version of the application.

4. The computer-implemented method of claim 1, wherein directing the client device to prevent updating the installation of the earlier version of the application comprises directing the client device to display a notification recommending that the installation of the earlier version of the application not be updated to the later version of the application.

5. The computer-implemented method of claim 1, wherein directing the client device to prevent updating the installation is further based on determining that a stability rating of the later version of the application fails to exceed a predetermined threshold.

6. A system for directing application updates, the system comprising:
    an identification module that:
    identifies, at a server, information that indicates a rate at which installations of an earlier version of an application are exploited in attacks on computing system security;
    identifies, at the server, additional information that indicates a rate at which installations of a later version of the application are exploited in attacks on computing system security;
    a determination module that determines, at the server, how updating the application from the earlier version to the later version will impact computing system security on at least one client device at least in part by determining, by comparing the rate at which installations of the earlier version of the application are exploited with the rate at which installations of the later version of the application are exploited, that the earlier version of the application is less likely to be exploited than the later version of the application;

a direction module that directs, by the server, the at least one client device to prevent updating an installation of the earlier version of the application to the later version of the application based at least in part on determining how updating the application will impact computing system security;

at least one processor configured to execute the identification module, the determination module, and the direction module.

7. The system of claim 6, wherein the direction module directs the client device to prevent updating the installation of the earlier version of the application by blocking an attempt to update the installation of the earlier version of the application to the later version of the application.

8. The system of claim 6, wherein the direction module directs the client device to prevent updating the installation of the earlier version of the application by directing the client device to display a notification recommending that the installation of the earlier version of the application not be updated to the later version of the application.

9. The system of claim 6, wherein the direction module directing the client device to prevent updating the installation is further based on determining that a stability rating of the later version of the application fails to exceed a predetermined threshold.

10. The system of claim 6, wherein the application comprises at least one of:
- a program;
- a driver;
- a module;
- a service;
- an operating system.

11. The system of claim 6, wherein the direction module directs the client device to prevent updating the installation of the earlier version of the application by directing the client device to not update the installation of the earlier version of the application to the later version of the application.

12. A non-transitory computer-readable-storage medium comprising one or more computer-readable instructions that, when executed by at least one processor of a computing device, cause the computing device to:
identify, at a server, information that indicates a rate at which installations of an earlier version of an application are exploited in attacks on computing system security;
identify, at the server, additional information that indicates a rate at which installations of a later version of the application are exploited in attacks on computing system security;
determine, at the server, how updating the application from the earlier version to the later version will impact computing system security on at least one client device at least in part by determining, by comparing the rate at which installations of the earlier version of the application are exploited with the rate at which installations of the later version of the application are exploited, that the earlier version of the application is less likely to be exploited than the later version of the application;
direct, by the server, the at least one client device to prevent updating an installation of the earlier version of the application to the later version of the application based at least in part on determining how updating the application will impact computing system security.

13. The non-transitory computer-readable-storage medium of claim 12, wherein directing the client device to prevent updating the installation of the earlier version of the application comprises directing the client device to not update the installation of the earlier version of the application to the later version of the application.

14. The non-transitory computer-readable-storage medium of claim 12, wherein directing the client device to prevent updating the installation of the earlier version of the application comprises blocking an attempt to update the installation of the earlier version of the application to the later version of the application.

15. The non-transitory computer-readable-storage medium of claim 12, wherein directing the client device to prevent updating the installation of the earlier version of the application comprises directing the client device to display a notification recommending that the installation of the earlier version of the application not be updated to the later version of the application.

16. The non-transitory computer-readable-storage medium of claim 12, wherein directing the client device to prevent updating the installation of the earlier version of the application is further based on determining that a stability rating of the later version of the application fails to exceed a predetermined threshold.

17. The non-transitory computer-readable-storage medium of claim 12, wherein the application comprises at least one of:
- a program;
- a driver;
- a module;
- a service;
- an operating system.

18. The non-transitory computer-readable-storage medium of claim 12, wherein the server comprises a security server that communicates with a plurality of client devices that comprise installations of the earlier version of the application and a plurality of client devices that comprise installations of the later version of the application.

19. The computer-implemented method of claim 1, wherein the application comprises at least one of:
- a program;
- a driver;
- a module;
- a service;
- an operating system.

20. The computer-implemented method of claim 1, wherein the server comprises a security server that communicates with a plurality of client devices that comprise installations of the earlier version of the application and a plurality of client devices that comprise installations of the later version of the application.

* * * * *